(12) United States Patent
Pautz et al.

(10) Patent No.: US 10,875,754 B2
(45) Date of Patent: Dec. 29, 2020

(54) INDUSTRIAL TRUCKS AND METHODS FOR OPERATING SAME

(71) Applicant: Jungheinrich AG, Hamburg (DE)

(72) Inventors: Alexander Pautz, Hamburg (DE); Lars Dohrmann, Hamburg (DE); Sebastian Rockel, Hamburg (DE)

(73) Assignee: Jungheinrich AG, Hamburg (DE)

( * ) Notice: Subject to any disclaimer, the term of this patent is extended or adjusted under 35 U.S.C. 154(b) by 87 days.

(21) Appl. No.: 16/169,079

(22) Filed: Oct. 24, 2018

(65) Prior Publication Data

US 2019/0119085 A1  Apr. 25, 2019

(30) Foreign Application Priority Data

Oct. 24, 2017 (DE) .................. 10 2017 124 832

(51) Int. Cl.
| | |
|---|---|
| *G06F 7/70* | (2006.01) |
| *B66F 9/075* | (2006.01) |
| *B66F 9/24* | (2006.01) |
| *B66F 9/07* | (2006.01) |
| *G06K 7/10* | (2006.01) |

(52) U.S. Cl.
CPC .............. *B66F 9/0755* (2013.01); *B66F 9/07* (2013.01); *B66F 9/07504* (2013.01); *B66F 9/24* (2013.01); *G06K 7/10861* (2013.01); *G05D 2201/0216* (2013.01)

(58) Field of Classification Search
CPC ...... B66F 9/0755; B66F 9/07; B66F 9/07504; B66F 9/24; G06K 7/10861
See application file for complete search history.

(56) References Cited

U.S. PATENT DOCUMENTS

| | | | |
|---|---|---|---|
| 5,208,753 A | 5/1993 | Acuff | |
| 5,938,710 A * | 8/1999 | Lanza | ..................... B66F 9/063 180/169 |
| 2004/0083025 A1 | 4/2004 | Yamanouchi et al. | |

(Continued)

FOREIGN PATENT DOCUMENTS

| | | |
|---|---|---|
| DE | 10033857 A1 | 1/2002 |
| DE | 102010055774 A1 | 6/2012 |
| DE | 102013111187 A1 | 4/2015 |

*Primary Examiner* — Adam M Alharbi

(74) *Attorney, Agent, or Firm* — Rankin, Hill & Clark LLP

(57) ABSTRACT

The invention relates to a method for operating an industrial truck (10), the industrial truck (10) comprising a lifting mechanism (12), a fork carrier comprising two fork prongs (16) being height-adjustably guided on the lifting mechanism (12), a preferably individual rack bay label (31, 32, 33) provided on a rack bay (F1, F2, F3) of a storage rack (30), particularly a high-bay storage rack, is captured as digital image data by means of a digital camera (18) disposed on a fork prong (16) or on the fork carrier, the digital images being preferably transmitted from the digital camera (18) to a computer unit (22) of the industrial truck (10), wherein the digital image data is analyzed by the computer unit (22) and transmitted after the analysis to a display panel of the industrial truck (10), particularly a display unit (24), and information corresponding to the captured rack bay label (31, 32, 33) of the rack bay (F1, F2, F3), particularly text information and/or symbols, is displayed on the display panel of the industrial truck (10).

14 Claims, 1 Drawing Sheet

(56) References Cited

U.S. PATENT DOCUMENTS

| | | |
|---|---|---|
| 2012/0191272 A1 | 7/2012 | Andersen et al. |
| 2016/0090285 A1* | 3/2016 | Svensson et al. |
| 2017/0176481 A1* | 6/2017 | Accurso ........... G01N 35/00871 |
| 2018/0203027 A1* | 7/2018 | Yasuzawa ........ G01N 35/00732 |

* cited by examiner

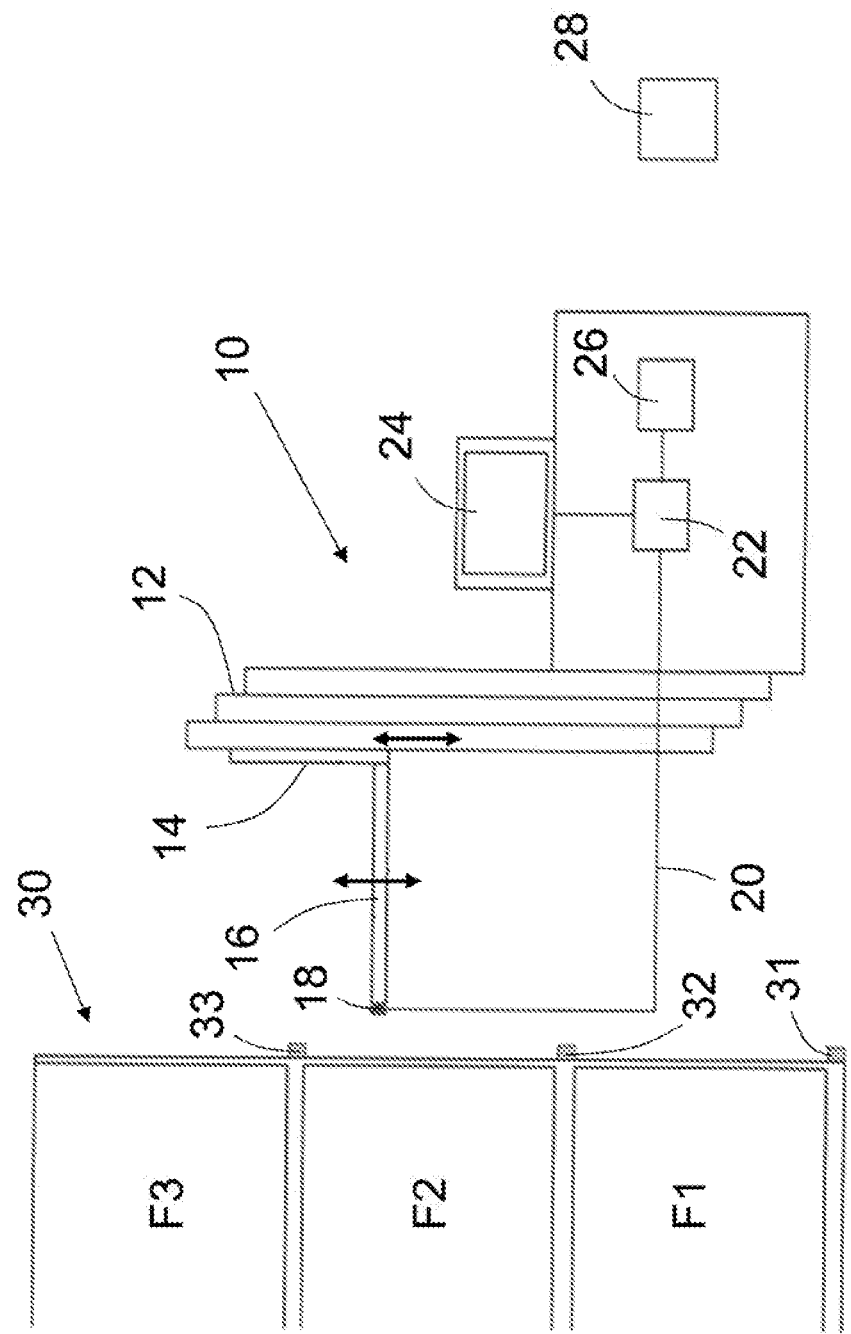

INDUSTRIAL TRUCKS AND METHODS FOR
OPERATING SAME

PRIORITY CLAIM

This application claims priority to German Patent Application No. DE 10 2017 124 832.3, filed Oct. 24, 2017.

BACKGROUND OF INVENTION

Field of Invention

The invention relates to a method for operating an industria and to an industrial truck.

Brief Description of Related Art

It is known that industrial trucks are used in logistics, particularly in internal logistics. Reach mast forklifts are known in particular as industrial trucks for lifting loads to very great heights and to place and remove loads from shelves or storage racks. It is thereby possible that loading heights in rack bays reach heights of 10 to 13 meters, wherein the operator remains near the floor on the industrial truck. Operating such industrial trucks thereby requires great experience in order to be able to perform the tasks of loading and unloading quickly, safely and effectively.

It is further known in the prior art that pallets or the labels of pallets are scanned using hand scanners. It is thereby not possible to scan the pallets at great heights in high-bay warehouses. In order to scan the labels of the pallets, the goods must be removed from the rack bay and brought down. It can thereby not be determined that the goods were taken from an incorrect rack bay until the goods have been removed from a bay.

It is further known for storage racks that barcodes are mounted on the storage rack and are scanned at height of the industrial truck.

The barcodes of all upper rack bays are in particular disposed closely spaced, one above the other. This can lead to a forklift driver scanning an incorrect barcode of a rack bay and thus placing the goods into an incorrect rack bay. The same applies for warehouse management software, so that the goods are stored in a different location from where they should be.

It is further known that operating personnel cannot detect readable clear texts on rack bays, for example for displaying bay numbers including the aisle, rack, level, and other relevant data by means of a hand scanner above head height or at greater heights.

BRIEF SUMMARY OF THE INVENTION

Based on said state of the art, embodiments of the present invention provide to facilitate loading goods into a rack bay or removing goods from a rack bay, wherein it should also be possible to accelerate the stacking tasks in a simple manner.

Embodiments are directed to a method for operating an industrial truck, the industrial truck comprising a lifting mechanism, a fork carrier comprising two fork prongs being height-adjustably guided on the lifting mechanism, a preferably individual rack bay label provided on a rack bay of a storage rack, particularly a high-bay storage rack, is captured as digital image data by means of a digital camera disposed on a fork prong or on the fork carrier, the digital images being preferably transmitted from the digital camera to a computer unit of the industrial truck, wherein the digital image data is analyzed by the computer unit and transmitted after the analysis to a display panel of the industrial truck, particularly a display unit, and information corresponding to the captured rack bay label of the rack bay, particularly text information and/or symbols, is displayed on the display panel of the industrial truck.

A display panel can be a display screen. Embodiments are based on the idea that individual rack bay labels are disposed at the rack bays of a storage rack, particularly a high-bay warehouse, and the individual rack bay labels are captured as digital image data by means of a digital camera. The digital camera, also implemented as a barcode scanner, is thereby disposed on a fork prong or on the fork carrier, the digital images being preferably transmitted to a computer unit. The video stream of the digital camera is examined for 1D and 2D barcodes and for clear text labels and analyzed by means of the computer unit, such as an "embedded PC." Any barcodes for the individual rack bay labels of the rack bays are thereby displayed to a user on the display panel or display screen, particularly the display unit, wherein the operating personnel can then select said data in order to then transmit the same to a preferably central warehouse management software system, for example, or to a warehouse management program.

One advantage of embodiments is that instead of a manual scanning task by a forklift driver, the task of scanning the individual rack bay label of the storage racks is automated, wherein the scanning task is performed, for example, with the fork carrier extended in the high-bay rack at heights outside the reach of the operating personnel. The advantage of the invention is further that a hand scanner is no longer needed by the operating personnel in order to perform a scan.

By means of embodiments, it is possible to quickly and reliably capture barcodes and clear text from individual rack bay labels mounted at the rack bays, wherein scanning of barcodes and clear texts of the rack bay labels is less subject to error, in contrast to a manually operated hand scanner according to the state of the art. Scanning of individual rack bay labels of the rack bays is thereby improved.

When using barcodes for the individual rack bay labels, the barcodes are analyzed by means of the computer unit and the information linked to each barcode is displayed on the display panel or display unit, for example in the form of text and/or symbols, by means of the display unit.

As part of embodiments, it can be provided that the recorded digital image data or the analyzed image data are transmitted directly to a computer of a warehouse management software.

If the individual rack bay label of a rack bay comprises clear text characters captured by the digital camera as digital image data, then according to the invention, the digital image data is analyzed and detected by means of the computer unit of the industrial truck, using an OCR (optical character recognition) program.

The method is further characterized in that the digital camera is implemented as a barcode scanner, particularly a 1D barcode scanner or a 2D barcode scanner or a QR scanner, and/or that the rack bay label comprises a barcode.

In addition, one embodiment of the method is characterized in that after displaying the information corresponding to the rack bay label of a rack bay by means of the display panel, and after a particularly interactive input by an operator, the image data and/or the information corresponding to the rack bay label is transmitted to a computer, particularly a computer of a materials management system.

According to an alternative embodiment, it is detected by means of a detecting device, preferably by means of a sensor, that goods have been removed from a rack bay having a rack bay label, or that goods have been loaded into a rack bay having a rack bay label, and that after capturing and analyzing the rack bay label, the digital image data and/or the information corresponding to the rack bay label is transmitted, particularly automatically, to a computer, particularly to a computer of materials management system. It is thereby possible, for example, that the storing or removing of goods or a pallet is captured, preferably automatically, by the industrial truck by means of a sensor, and then the digital image data and/or the information corresponding to the rack bay label is transmitted automatically to a computer of a materials management system, so that interactive entering by an operator is eliminated. It is further thereby possible that the information corresponding to the rack bay label of a rack bay, and the transmitting of the information corresponding to the rack bay label of a rack bay, is displayed to the further computer by means of the display panel.

According to a further consideration, the rack bay label is captured as digital image data before or after goods are placed in the rack bay.

It is further provided according to a further consideration of the method that the rack bay label is captured as digital image data before or after goods are removed from the rack bay.

In accordance with the embodiments it is provided an industrial truck having a lifting mechanism, a fork carrier comprising two fork prongs being height-adjustably guided on the lifting mechanism, a digital camera is provided on a fork prong or on the fork carrier for capturing a preferably individual rack bay label of the rack bay mounted on the rack bay of a storage rack, particularly a high-bay storage rack, as digital image data, the industrial truck comprising a computer unit for analyzing the digital image data and connected to the digital camera, and the industrial truck comprising a display panel for displaying information, particularly text information and/or symbols, corresponding to the captured rack bay label, wherein the industrial truck is set up for performing the method described above.

The advantage of the embodiments is that digital image data of each individual rack bay label of a rack bay is provided by means of the digital camera, for example at a height of over 3 or 5 meters, wherein the digital image data is evaluated correspondingly by means of the computer unit. The image data is thereby analyzed for barcodes and/or for clear text characters, for example. The information linked to the automatically detected barcodes of the individual rack bay label is then displayed to the operating personnel on a display panel or display screen, particularly a display unit, wherein the displayed information of a corresponding operator input by the operating personnel is then transmitted to a warehouse management software system on a different computer. Altogether, individual rack bay labels are associated with each rack bay.

According to the embodiments, it can thereby be provided that the digital camera comprises a detecting unit for detecting barcodes. The computer unit and the display panel can also be disposed in one product or one structural unit.

The computer unit of the industrial truck is particularly implemented as an image processing unit for processing and detecting barcodes and clear text characters, wherein the image processing unit is connected to or linked to the display panel for user interaction and/or for warehouse management.

According to the embodiments, stacking tasks in a warehouse, particularly a high-bay warehouse, can be simplified and accelerated by automation according to the invention, wherein automation is improved for interaction with warehouse management software.

Further features of the invention will become apparent from the description of embodiments according to the invention, together with the claims and the attached drawing. Embodiments according to the invention can fulfill individual features or a combination of a plurality of features.

BRIEF DESCRIPTION OF THE DRAWINGS

The invention is described below, without limiting the general idea of the invention, using embodiment examples with reference to the drawing, wherein reference is made expressly to the drawing with respect to all details not explained further in the text. In the drawing:

FIG. 1 A schematic view of a rack and an industrial truck.

DETAILED DESCRIPTION OF THE INVENTION

FIG. 1 shows a schematic view of a schematically represented industrial truck 10, wherein elements not essential to the invention are not depicted for reasons of visibility.

The industrial truck 10 comprises a lifting mechanism 12 on which a load carriage 14 is height-adjustably guided. The load carriage 14 further comprises two fork prongs 16, wherein for reasons of depiction, only one fork prong 16 is shown or visible. A digital camera 18 by means of which the individual rack bay labels are captured is disposed on the end face of the fork prong.

In the side view shown in FIG. 1, the industrial truck 10 is positioned in front of a rack 30. The rack 30 is particularly implemented as a high-bay warehouse and comprises a plurality of rack bays F1, F2, F3 disposed one above the other, in which corresponding goods are loaded and unloaded on pallets, for example, The per se known tasks of loading and unloading the goods are performed using the industrial truck 10.

Individual rack bay labels 31, 32, 33 are disposed in the region of the rack bay floor on the front side of the rack 30 for each rack bay F1, F2, F3. The rack bay labels 31, 32, 33 are implemented as a barcode and/or clear text characters, whereby the associated rack bay F1, F2, F3 is specified and labeled.

When positioned opposite the corresponding rack bay label 31, 32, 33, the corresponding labels are captured as digital image data by means of the digital camera 18 and transmitted to a computer unit 22 of the industrial truck 10 via connecting line 20. The digital camera 18 is thereby connected to the computer unit 22 via the connecting line 20.

The digital image data is analyzed and accordingly implemented by means of the computer unit 22, so that the individual rack bay labels 31, 32, 33 for each rack bay F1, F2, F3 are represented in the processed form on a display 24 of the industrial truck 10. The individual data and information about each captured rack bay label 31, 32, 33 are shown on the display unit 24 for an operator.

In addition, input means (not shown) are also provided, whereby the specific and identifying data and information for a rack bay is transferred from the computer unit 22 to a second computer 26 when a corresponding input is made by an operator. The computer 26 is thereby a component of a logistics warehouse management system, for example, whereby the goods loaded into or out of the rack 30 are managed. The computer 26 can additionally be connected to a further external computer 28 of the warehouse management system, for example by means of a wireless connection.

All features indicated, including those found alone in the drawing, and all features, including individual features, disclose in combination with other features, are considered to be essential to the invention both alone and in combination. Embodiments according to the invention can be fulfilled by individual features or a combination of a plurality of features. Features labeled as "particularly" or "preferably" within the invention are understood to be optional.

REFERENCE LIST

10 Industrial truck
12 Lift mechanism
14 Load carriages
16 Fork prongs
18 Digital camera
20 Connecting line
22 Computer unit
24 Display unit
26 Computer
28 Computer
30 Rack
31 Rack bay label
32 Rack bay label
33 Rack bay label
F1 Rack bay
F2 Rack bay
F3 Rack bay

What is claimed:

1. A method for operating an industrial truck having a lifting mechanism and a fork carrier including two fork prongs that are height-adjustably guided on the lifting mechanism, the method comprising:
   capturing an individual rack bay label provided on a rack bay of a storage rack as digital image data using a digital camera disposed on one of the two fork prongs or on the fork carrier;
   transmitting the digital image data from the digital camera to a computer unit of the industrial truck;
   analyzing the digital image data using the computer unit; and
   transmitting, after the analyzing step, information corresponding to the captured rack bay label to a display panel of the industrial truck.

2. The method according to claim 1, wherein the display panel comprises a display unit, and wherein the information corresponding to the captured rack bay label is displayed on the display unit for view by an operator of the industrial truck.

3. The method according to claim 1, wherein the information corresponding to the capture rack bay label comprises one or more of text information and symbols.

4. The method according to claim 1, wherein the digital camera is implemented as a barcode scanner and the rack bay label comprises a barcode.

5. The method according to claim 4, wherein the barcode scanner is a 1D barcode scanner, a 2D barcode scanner or a QR scanner.

6. The method according to claim 1, wherein clear text characters are captured as the rack bay label using the digital camera.

7. The method according to claim 1, wherein, after the information corresponding to the captured rack bay label is displayed by the display panel, one or more of the digital image data and the information corresponding to the captured rack bay label is transmitted to a second computer.

8. The method according to claim 7, wherein the one or more of the digital image data and the information corresponding to the captured rack bay label is transmitted to the second computer based on an interactive entry made by an operator of the industrial truck.

9. The method according to claim 7, wherein the second computer is a computer of a materials management system.

10. The method according to claim 1, further comprising detecting using a detector that goods are present in, have been taken out of, or have been placed into the rack bay having the rack bay label, and after the rack bay label of the rack bay has been captured and analyzed, one or more of the digital image data and the information corresponding to the rack bay label is transmitted to a second computer.

11. The method according to claim 10, wherein the second computer is a computer of a materials management system.

12. The method according to claim 10, wherein the rack bay label is captured as digital image data before or after goods are placed in the rack bay.

13. The method according to claim 10, wherein the rack bay label is captured as digital image data before or after goods are removed from the rack bay.

14. An industrial truck comprising:
   a lifting mechanism;
   a fork carrier including two fork prongs that are height-adjustably guided on the lifting mechanism;
   a digital camera provided on a fork prong or on the fork carrier that is configured to capture an individual rack bay label mounted on a rack bay of a storage rack as digital image data;
   a computer unit connected to the digital camera configured to analyze the captured digital image data; and
   a display panel configured to display information transmitted by the computer unit corresponding to analyzed captured digital image data.

* * * * *